(12) United States Patent  
Mountain

(10) Patent No.: US 9,326,027 B2  
(45) Date of Patent: *Apr. 26, 2016

(54) CONTENT RECOGNITION AND CENSORSHIP

(71) Applicant: ECHOSTAR UK HOLDINGS LIMITED, Yorkshire (GB)

(72) Inventor: Dale Llewelyn Mountain, Yorkshire (GB)

(73) Assignee: EchoStar UK Holdings Limited, Steeton (GB)

( * ) Notice: Subject to any disclaimer, the term of this patent is extended or adjusted under 35 U.S.C. 154(b) by 0 days.

This patent is subject to a terminal disclaimer.

(21) Appl. No.: 14/547,146

(22) Filed: Nov. 19, 2014

(65) Prior Publication Data

US 2015/0074739 A1    Mar. 12, 2015

Related U.S. Application Data

(63) Continuation of application No. 13/880,091, filed as application No. PCT/EP2011/072460 on Dec. 12, 2011, now Pat. No. 8,904,420.

(30) Foreign Application Priority Data

Dec. 10, 2010 (EP) ..................................... 10194510

(51) Int. Cl.
| | |
|---|---|
| *H04H 60/32* | (2008.01) |
| *H04N 7/16* | (2011.01) |

(Continued)

(52) U.S. Cl.
CPC ...... *H04N 21/4542* (2013.01); *G06F 17/30017* (2013.01); *H04N 21/4394* (2013.01); *H04N 21/4396* (2013.01)

(58) Field of Classification Search  
None  
See application file for complete search history.

(56) References Cited

U.S. PATENT DOCUMENTS

| | | |
|---|---|---|
| 5,371,795 A | 12/1994 | Vogel |
| 6,075,550 A | 6/2000 | Lapierre |

(Continued)

FOREIGN PATENT DOCUMENTS

| | | |
|---|---|---|
| GB | 2449742 A | 12/2008 |
| WO | 2012/076724 A1 | 6/2012 |

OTHER PUBLICATIONS

International Search Report and Written Opinion for PCT/EP2011/072460, 9 pages.

(Continued)

*Primary Examiner* — Mushfikh Alam  
(74) *Attorney, Agent, or Firm* — Kilpatrick Townsend & Stockton LLP

(57) ABSTRACT

A method for controlling the output of media content, particularly audio content, to a user in relation to an apparatus, such as a set-top-box, having an input, for receiving media content, and an output, for providing the media content to an output device such as a television or other display device. Media content is received at the input and then analyzed using a media content recognition unit. The media content recognition unit undertakes the step of identifying portions of the received media content that contain undesired content, such as offensive language. The output of media content to a user is then controlled, based on any identified undesired content, to prevent the output of content when the identified undesired portions are to be output. A corresponding apparatus and computer program are also provided.

20 Claims, 2 Drawing Sheets

(51) Int. Cl.
*H04N 7/10* (2006.01)
*H04N 7/025* (2006.01)
*H04N 21/454* (2011.01)
*G06F 17/30* (2006.01)
*H04N 21/439* (2011.01)

(56) References Cited

U.S. PATENT DOCUMENTS

| | | | |
|---|---|---|---|
| 6,166,780 A * | 12/2000 | Bray | 348/632 |
| 6,553,566 B1 | 4/2003 | Grant et al. | |
| 6,972,802 B2 | 12/2005 | Bray | |
| 7,139,031 B1 | 11/2006 | Bray | |
| 8,079,044 B1 * | 12/2011 | Craner | H04N 21/4532 725/28 |
| 8,312,485 B2 | 11/2012 | Robson et al. | |
| 8,516,536 B2 | 8/2013 | Chin et al. | |
| 2003/0093790 A1 * | 5/2003 | Logan | G06F 17/30265 725/38 |
| 2004/0210928 A1 | 10/2004 | Hamzy et al. | |
| 2006/0031870 A1 | 2/2006 | Jarman et al. | |
| 2006/0095262 A1 | 5/2006 | Danieli | |
| 2007/0055980 A1 * | 3/2007 | Megeid | H04N 7/162 725/28 |
| 2008/0060037 A1 | 3/2008 | Isaacson | |
| 2008/0184284 A1 | 7/2008 | O'Hern | |
| 2008/0294439 A1 * | 11/2008 | Kirby | 704/251 |
| 2010/0017818 A1 | 1/2010 | Joshi et al. | |
| 2010/0077435 A1 * | 3/2010 | Kandekar | G11B 27/005 725/61 |
| 2011/0302599 A1 | 12/2011 | Eyer | |
| 2012/0331498 A1 * | 12/2012 | Houston | 725/14 |
| 2013/0298180 A1 | 11/2013 | Mountain | |
| 2015/0074739 A1 * | 3/2015 | Mountain | 725/131 |

OTHER PUBLICATIONS

International Preliminary Report on Patentability for PCT/EP2011/072460 issued Jun. 12, 2013, 7 pages.

* cited by examiner

CONTENT RECOGNITION AND CENSORSHIP

CROSS-REFERENCES TO RELATED APPLICATIONS

This application is a continuation of U.S. patent application Ser. No. 13/880,091, filed on Jul. 14, 2013, entitled "CONTENT RECOGNITION AND CENSORSHIP", which is a U.S. National Stage of International Application No. PCT/EP2011/072460, filed Dec. 12, 2011, designating the United States, and claiming the benefit of European Patent Application No. 10194510.3, field with European Patent Office on December 10, hereby incorporated herein by reference.

TECHNICAL FIELD

This invention relates to a system and method for controlling the output of content from a device, and particularly to the automatic recognition and censorship of media content such as audio.

BACKGROUND OF THE INVENTION

Media content, such as television, film or radio often contain particular content that may be considered by some to be offensive. Although video and/or audio content may be provided with a suitable age rating this is not always sufficient to prevent offense. For example, certain language, whilst deemed suitable for a particular age range by a regulatory body, may not be considered suitable by a parent.

Often parents would allow their children to experience certain media content, such as films or television programs, if any offensive language were filtered out.

Systems are known for performing word recognition on an audio stream, and altering the audio stream to remove undesired language. However, such systems are either not capable of doing so "on the fly" in real time, or would require large amounts of processing power to do so. This makes known systems expensive and not particularly suitable for media content that the user would generally like to experience without having to wait, such as media content provided by broadcast.

SUMMARY OF THE INVENTION

The invention is defined in the claims to which reference is now directed. Advantageous features are set forth in the dependent claims.

Embodiments of the invention provide a method for controlling the output of media content, particularly audio content, to a user in relation to an apparatus having an input, for receiving media content, and an output, for providing the media content to an output device such as a television or other display device. According to the method, media content is received at the input and then analyzed using a media content recognition unit. The media content recognition unit undertakes the step of identifying portions of the received media content that contain undesired content, such as offensive language. The output of media content to a user is then controlled, based on any identified undesired content, to prevent the output of content when the identified undesired portions are to be output. Particularly, media content that has been sent to the output of the apparatus, for output to a user, may be prevented from reaching the user by controlling the output of the apparatus. By preventing the output of media content to a user, rather than, for example, altering the media content signal itself, a significant reduction in required processing power is achieved.

Preventing the output of media content to the user can be achieved in a number of ways. The display device may have a function for interrupting its own output of media content. The method would therefore involve controlling this function in the display device. Alternatively, the method could achieve the same result by impairing the output of the apparatus, which is providing a signal to the display device.

Media content is typically broadcast with accompanying time reference data. The time references can be used to identify the start time of media content containing the undesired material. The output of media content could then be prevented for a predetermined time to prevent all of the undesired material being output, or a sufficient portion to make the undesired material incomprehensible to a user. Alternatively, the time reference could be used to identify the start and end times of the undesired media content portions. The output of media content can then be prevented during the times identified by the apparatus referring to the time reference and the identified times.

The method may be implemented in a set-top-box for receiving and decoding broadcast media content for output to a display device. Such set-top-boxes typically include a media decoder, or main processor, for this purpose, to allow users to view content. An additional processor, preferably a digital signal processor (DSP) may also be provided for a specific purpose, such as formatting media content data so that it can be played on different display devices. The method may further include the step of using the additional processor as part of the media content recognition unit to identify undesired content. This serves to further reduce the processing burden on the main processor.

The media content recognition unit performs certain steps to identify undesired content. Predetermined undesired content is specified by descriptors, or associated data, which may be specified by populating a list in a memory unit. The media content recognition unit compares received media content with the predetermined content specified by the descriptors. In particular, where the media content being checked is audio content, the media content recognition unit executes speech recognition software for detecting the undesired audio.

The method finds particular utility with television signals broadcast to a set-top-box for viewing, the method being used to identify and censor words found in the audio signal. The recognition unit identifies undesired content using the descriptors preferably by processing received media data to identify words within the content by comparing it with the descriptors, the descriptors being a list of undesired words or data representative thereof.

The act of identifying words within content may be limited to a comparatively small set of words. The number of words may be selected so that the recognition unit can identify those words within a specified time period, such as the time period required by a decoder, such as an AV decoder of a set-top-box, to decode a portion of media data/content. The number of words to be identified may be less than 100, less than 60, less than 40 or less than 20. Comparison with a small set of words requires less processing power and can be performed quickly, allowing the censoring to be performed "on the fly" as the user accesses content.

The number of identified undesired words may be limited to a maximum number such that the step of analyzing the media content using a media content recognition unit to identify one or more portions that contain undesired content includes comparing received audio content with data stored on a memory, the comparisons being performed with a maximum number of words, or up to a maximum number of words. This can be achieved, for example, by limiting the number of comparisons performed by the system, or limiting the number of words that are stored on the memory itself. The maximum number of words may be selected such that the recognition unit can compare the received audio with the maximum number of identified words within a specified time period, in particular the maximum number of words may be selected based on the time taken for a decoder to decode a portion of media content, the maximum number of words being such that the recognition unit can compare the portion of received audio content with the identified number of undesired words within the time taken for the decoder to decode the portion of media content. By selecting the maximum number of words in this way the comparison of words with received audio content can be performed at the same rate, or a greater rate, as the received audio content is decoded by the decoder. This allows the audio content to be checked and censored in real time.

Embodiments of the invention also include a corresponding apparatus comprising an input for receiving media content and an output for providing the media content to a display device for display to a user. The apparatus further comprises a media content recognition unit, for identifying one or more portions of received media content that contain undesired content, and a control unit to control the output of content to a user, preferably simultaneously, when identified portions of media content are to be output by the apparatus.

The control unit performs the task of controlling the function on a display device to interrupt the output of media content from the display device, or impairing the output of the apparatus itself to the display device, when the identified undesired portions of media content are to be output.

The apparatus preferably comprises a memory for storing the descriptors. The amount of memory required is reduced by only using a comparatively small set of descriptors.

When used to identify undesired words, the media content comprising audio content, the memory stores data identifying undesired words, such as a list of undesired words. The data preferably identifies a maximum number of words, the media content recognition unit being configured to analyze the media content to identify one or more portions that contain undesired content by comparing received audio content with data stored on the memory. The maximum number of words that can be stored on the memory is selected such that the recognition unit can identify those words within a specified time period. The maximum number of words that can be stored on the memory is selected based on the time taken for a decoder to decode a portion of media content, the maximum number of words being such that the recognition unit can compare the portion of received audio content with all stored identified undesired words within the time taken for the decoder to decode received media content. In other words, the comparison of words with received audio content can be performed at the same rate, or at a greater rate, as the received audio content is decoded by the decoder by appropriately selecting the maximum number of words for comparison.

The apparatus preferably comprises a first processor for decoding received media content to be displayed to a user, and also a second additional processor which is preferably a DSP. The second processor is used in the media content recognition unit to identify undesired content.

The apparatus may be implemented in a set-top-box of the type used to receive television broadcasts.

A computer program may be provided for undertaking any of the method steps outlined above, preferably on a set-top-box or similar device, such as the apparatus described above.

BRIEF DESCRIPTION OF THE DRAWINGS

Examples of the invention will now be described in more detail, with reference to the drawings in which.

DETAILED DESCRIPTION OF THE PREFERRED EMBODIMENTS

Figure 1:
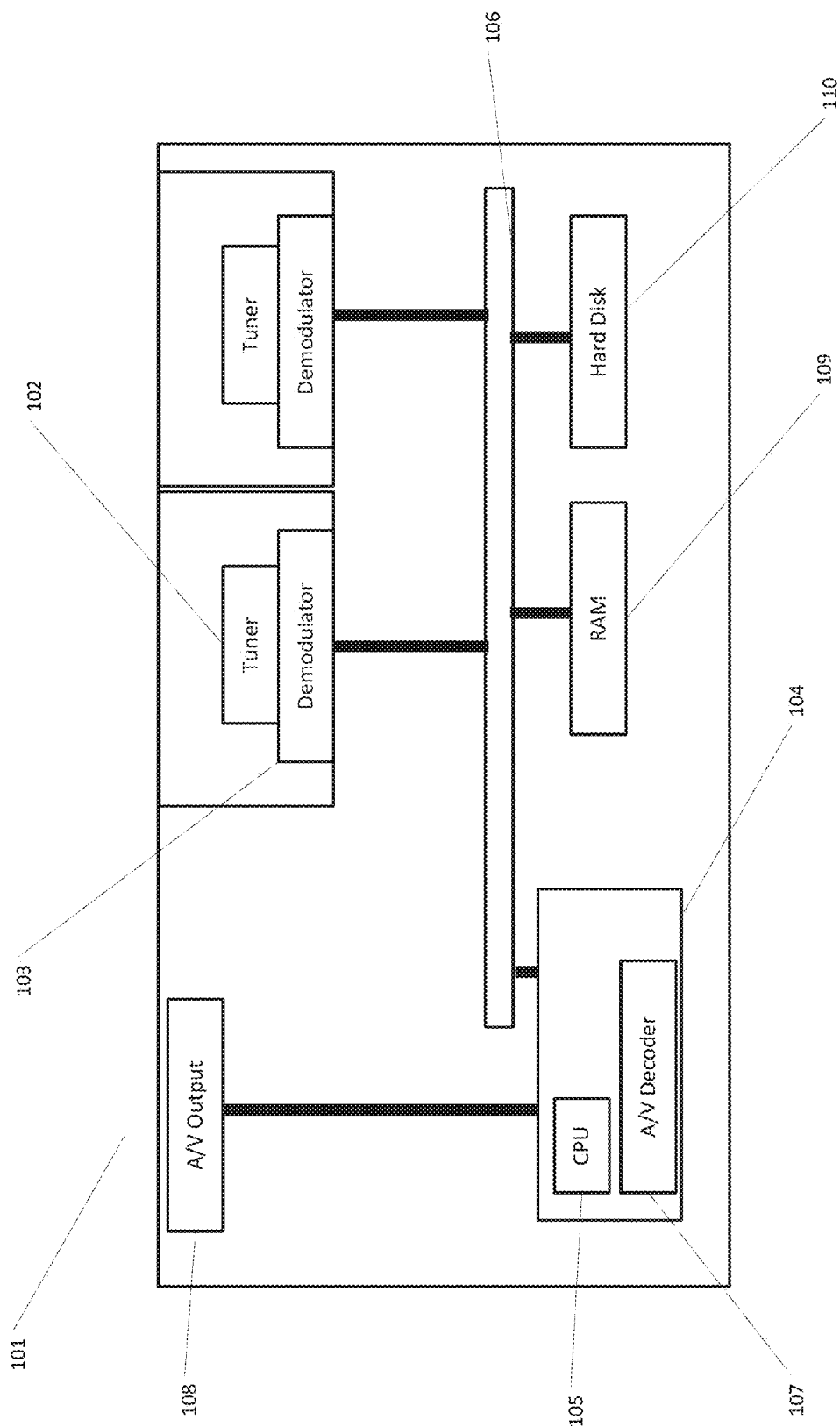
FIG. 1 is a diagram of a set-top-box in which embodiments of the invention may be implemented.

A first example of the invention may be implemented with a set-top-box of the sort shown in FIG. 1. The set-top-box 101 comprises a receiver for receiving broadcast signals including encoded media content, such as video and audio content. The media content is provided to a processor for decoding and outputting the content. In the example of FIG. 1, a tuner 102 is included that tunes to and amplifies a particular analogue broadcast frequency, although a digital arrangement could be used for receiving digital broadcasts. A demodulator 103 converts the signal from the tuner into a digital signal that may be processed by the processor. The set-top-box may be equipped to receive and process multiple broadcasts, for example by having tuner/demodulator packages that can each display/record a television channel simultaneously with the other channel.

The tuner/demodulator is connected to a processor chip 104, comprising a CPU 105, by a bus 106. The main processor 104 of the set-top-box runs the set-top-box software and controls and coordinates the other set-top-box components. The AV decoder 107 is responsible for decoding the audio and video data and may be provided on the same physical chip as the CPU. The AV decoder receives and decodes the signal provided by the demodulator. The decoded audio/video signals are provided to the AV output, or AV control, 108, which provides an audio and video signal that can be connected to an output device or display device such as a television. During normal operation the processor chip will commonly be running at 80%-90% of maximum capacity. It is uneconomical to have excess processing power in such a device intended for mass production. The RAM 109 can be used by both the processor and the decoders. The hard disk 110 is optionally provided for storing recorded content for presentation at a later time. The hard disk can also be used to store metadata and tables containing descriptors of the type described below, or a flash memory could alternatively, or in addition, be provided for this purpose.

In addition to the components shown in FIG. 1, the set-top-box also includes another processor, a digital signal processor (DSP), which may be provided for a task such as converting media content or manipulating its format for compatibility with another display device such as a personal computer or mobile device.

An incoming broadcast signal is decoded to produce decoded media content. The audio content is provided to the additional DSP, which is used as a media content recognition unit. The media content recognition unit executes speech recognition software for detecting undesired speech. This operates by comparing specific words from the incoming audio stream with pre-stored data identifying undesired words. The data, which may be referred to as descriptors since they are related to, or describe, the undesired words, may be a list of words stored in memory. If a match is found between an incoming word and a pre-stored word the set-top-box is arranged to take action to prevent this word being output to the user.

The action to prevent a word being output to the user is taken by an output control unit. When an undesired word is detected the output control unit is alerted and instructs the muting of the audio output of the set-top-box during the period that the undesired word occurs in the audio signal. The output control unit may be comprised of the main processor, and preferably comprises the main CPU and the AV control unit.

Figure 2:
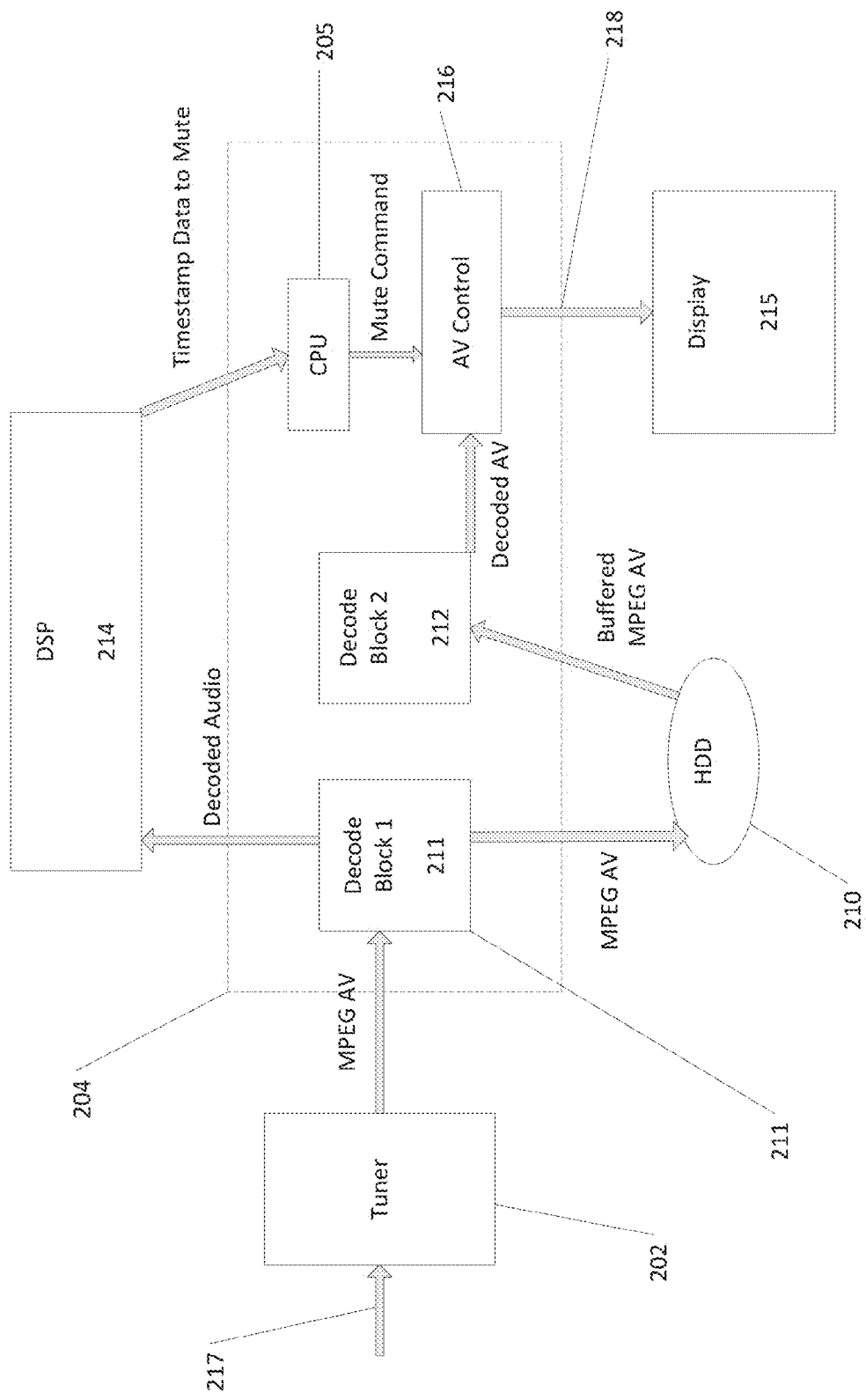
FIG. 2 is a diagram of a set-top-box according to an embodiment of the invention.

FIG. 2 shows a more detailed diagram of the set-top-box components for implementing an example of the invention. The set-top-box comprises a tuner 202, for receiving broadcast media content via an input 217 such as from an aerial, satellite or cable. The media content will typically be broadcast in an encoded form, such as according to any of the MPEG standards, and so at least one decode block 211 is provided for decoding received content. A plurality of decode blocks may be provided for decoding different portions of the media content; in the example of FIG. 2, two decode blocks, 211 and 212, are provided. The tuner 202 is coupled to at least one of the decode blocks. A DSP 214 is provided and is coupled to at least one of the decode blocks, preferably a decode block that is also coupled to the tuner, for receiving media content. The DSP 214 is also coupled to a CPU 205. An AV control unit 216 is coupled to the CPU, at least one of the decode blocks and at least one output display device 215, via an output 218, for displaying or outputting media content. The AV control unit outputs AV in any desired format compatible with the output device including component signal, composite signal, L+R audio, S/PDIF digital audio and/or HDMI. A hard disk drive (HDD) 210 is preferably provided, being coupled to the decode blocks for exchanging data.

In the example of FIG. 2, broadcast audio and video content, such as MPEG encoded AV content, is received by a tuner 202 and passed to the first decode control block 211. Audio is decoded using the first decode block, and the decoded audio is then sent to the DSP. The first decode block also passes the encoded AV, containing both the audio and video content, to the HDD 210 for storage.

The DSP determines the times at which undesired audio occurs in the AV stream. The position within an audio stream at which an undesired word occurs can be identified using the associated timing data that accompanies the media content as is common in broadcasts. There are many sorts of timing information that can be used, the important point being that the timing information allows a specific portion of the audio stream of a film or television program to be identified and referenced by the system, preferably by referencing the received timing data to the on-board clock of the set-top-box. One example would be to use the presentation time stamp (PTS), which is a metadata field in an MPEG program stream that is used to synchronize the separate streams of a program, such as the video and audio streams, when the program is output for display to a user. The PTS is provided in units related to a program's overall clock reference such as a program clock reference (PCR) or system clock reference (SCR) which would also be transmitted in the metadata of an MPEG program stream. The PCR or SCR could also be used to identify the locations of undesired language in an audio stream. Whatever method of identification used for the time, at least the start timestamp, and preferably also the stop timestamp, of undesired audio is identified by the DSP and referenced to the system time. The timestamps are then sent to the main processing core 204.

The determination of timestamps for undesired audio is performed by the DSP while the encoded AV is stored on the HDD 210. In effect, the AV media content is buffered while the DSP performs the necessary processing to identify the undesired audio content. The buffered and encoded AV is then sent back from the HDD 210 to the second decode block 212, which decodes the AV in the normal manner performed by set-top-boxes. The amount of buffering depends upon the amount of time required by the DSP to identify the timestamps of undesired audio. Typically this will be a relatively short period of time, such as between 5 and 30 seconds. The buffering time could be a predetermined period based on average processing time. Alternatively the buffering time could be dependent upon receiving a signal from the DSP indicating that it has finished scanning a predetermined portion of media content.

In some examples it may not be necessary to buffer the encoded AV on a HDD, with the full AV stream being presented to the user following a delay in which the audio is inspected for undesired words as described above. Typically, set-top-boxes take several seconds, such as less than 10 seconds, less than 5 seconds, less than 3 seconds or between 2 or 3 seconds to decode the audio and video streams for presentation/display to a user depending upon factors such as the model of set-top-box and the encoding format for the content. The DSP can be arranged to perform the necessary voice recognition in a similar time, for example by providing a DSP with sufficient processing speed, and/or programming the DSP to identify a small predetermined group of undesirable words. Therefore, the DSP can perform identification of undesired media content simultaneously with the decoding of the AV content for display to the user.

The act of identifying words within content may be limited to a comparatively small set of words. The number of words contained within the set is preferably the number of offensive words contained in a particular language, although this could be expanded to more than one language. The user may be able to select the language, or more than one language, and the set-top-box will automatically populate the relevant memory portion with data for identifying relevant words which have been pre-determined, based on data in the set-top-box or received over a communication channel. The user may alternatively, or in addition, be able to specify undesired words themselves by selecting the words from a list, or manually entering the word into the system via a user input. The list may be updatable, with the memory that stores the relevant content data, or descriptors, being able to receive commands to include additional words, and to remove old words. In practice, the list of words will be relatively small, and can be maintained as such by updating the word memory.

The device may be arranged to be able to search for a maximum number of words. The maximum number of words may be selected based on the time taken for a decoder to decode a portion of media data. In particular, the number of words may be selected such that the recognition unit can identify those words within a specified time period, such as the time period required by a decoder, such as an AV decoder of a set-top-box, to decode a portion of media data. Alternatively, the maximum number of words may be a predetermined number, for example based on the number of offensive words in a particular language. The number of words to be identified may be, for example, less than 100, less than 60, less than 40 or less than 20. Comparison with such a small set of words requires less processing power and can be performed quickly, since fewer comparison acts need to be performed by the recognition unit. Searching for only a small number of words therefore allows embodiments of the invention to operate and censor content "on the fly", or close to real time, as the user accesses content, such that the user does not notice a delay when viewing the checked content.

Once any undesired words are detected in the decoded audio stream the timestamp for the start of the word is identified from the program metadata as described above. The system could then mute the audio for a predetermined period of time from this time stamp, the period being sufficient to prevent display/output of all or part of the word to the user. Alternatively, the end point or timestamp of the undesired word could also be identified by the DSP and the audio output could be muted for the period between the start and end of the word.

The timestamp data relating to the undesired audio are passed to the main processing core. The CPU 205, upon receipt of timestamp data from the DSP issues a mute command to the AV control unit 216 containing an instruction to mute and the relevant timestamps at which to begin, and preferably end, muting of the output audio. The AV control unit, in response to instructions from the CPU, therefore mutes and un-mutes audio as appropriate, preventing the audio from reaching the display device. As an alternative, the AV control unit or the CPU may have direct control over a mute function in the display device, and the muting is put into effect at this point rather than at the AV output of the set-top-box.

In the example of FIG. 2 the DSP may be intended to form part of what is known as a "SLING" system or similar device. The DSP runs software programmed to encode video/audio according to a particular format such that it may be transmitted to other playback or display devices for viewing by a user in another location. For example, the DSP may encode a program so that it can be then be transmitted over the internet to a personal computer, mobile phone, PDA or internet connected television for remote viewing. To implement the example of the invention, the DSP is reprogrammed, by providing alternative software in the memory used by the DSP. This may be a flash memory, hard drive or any other memory coupled to the DSP. The DSP is therefore used for a purpose other than that for which it was originally intended.

The alternative software used includes voice recognition software preferably programmed to recognize a small set of words identified by a table of descriptors stored in memory. Voice recognition programs are well known and will not be described further.

It will be appreciated that viewers may be capable of lip reading and therefore offensive words may still be displayed through the video signal, rather than from the audio output device such as television speakers. A further example of the invention may therefore also have the capability to obscure faces, or parts of faces, of the actors or people featured in the video stream.

When undesired words are detected in the manner outlined above the time stamps of the relevant audio are recorded, for example in a table in memory, for muting when the audio is output. Facial recognition software is executed on the video stream at the identified time stamp to identify faces. The video stream can then be manipulated or altered to obscure the face or a portion of it such as the lips, for a period of time, so that the undesired word cannot be determined by visual inspection by the user.

It will be appreciated that facial recognition software can be rather processor intensive. This is mitigated in examples of the present invention in several ways. Firstly, the facial recognition software is only executed at those time stamps at which undesired words are found by the audio recognition software. This means that the facial recognition software is not continually operating, and only operates at times at which undesired words are determined to have occurred. Secondly, the facial recognition software may only be required to recognize a face, and not a particular person, so that any face being displayed at the same time stamp of the undesired word is obscured rather than identifying the particular person on screen who spoke the word. Thirdly, the facial recognition software can be executed on the separate DSP as mentioned above, or on a further separate purpose built DSP.

The facial recognition software could be programmed to recognize movement in a person's lips and blur the entire face, or lips, based on this. Since the facial software would only be looking for movement features in a person's lips, the system could blur or obscure the lips of the person talking, rather than all faces on screen, when the undesired words occur. It would be possible to base the search for undesired content on video media data, for example by using video recognition software, or facial recognition software. This may be achieved, for example, by looking for predetermined movements of a person's lips that correspond to undesired content based on stored data relating to the predetermined movements in the same manner as described for audio, and obscuring the relevant portions of the video output and preferably also the audio output when the undesired content is being output. However, the audio method is preferred.

Embodiments of the invention have been described in relation to set-top-boxes for receiving and descrambling broadcast video and accompanying audio data, particularly over the air. It will be appreciated that this is not a limitation of the invention, which may equally be applied to any device for receiving and outputting media content. This would include televisions with inbuilt set-top-boxes, computers connected to the Internet or other network, mobile phones or similar mobile devices able to output media content, PDAs and so forth. The invention could also be applied to audio only devices such as radios, including digital radios.

It would also be possible to produce a stand-alone device dedicated to the task of identifying undesired content and preventing its output to a user. The device could be positioned between a media content output and a display device, such as between the output of a set-top-box and the input of a television.

The invention has been described in the context of receiving audio, or audio and video, by broadcast. The term "broadcasting" should also be taken to encapsulate delivery of data by any form such as over the air, via the Internet, cable or satellite or any other type of transmission. It will also be appreciated that the present invention could be utilized in any device with an input for media content and an output for a display device. This would include DVD players or similar devices for playing pre-stored content including hard disk drive recorders, as well as other media devices such as video game consoles, and any other device that can be appropriately configured.

What is claimed is:

1. A method for controlling output of media content to a user, for an apparatus comprising an input for receiving the media content and an output for providing the media content to an output device, the method comprising:
   receiving the media content at the input, wherein the media content comprises a plurality of words;
   analyzing the media content using a media content recognition unit to identify one or more portions of the media content that contain undesired words based on a list of undesired words, wherein:
   the list of undesired words is stored by the apparatus; and a number of undesired words present on the list of undesired words is selected based on a time taken for a decoder to decode the media content;

controlling the output of the apparatus to prevent the output of the media content to the user when the one or more undesired words of the media content are to be output;

wherein the media content includes audio content, and wherein:

the analyzing the media content using the media content recognition unit to identify one or more portions that contain undesired words includes comparing the received audio content with data stored on a memory, the data identifying the one or more undesired words;

wherein a maximum number of undesired words is selected based on the time taken for the decoder of the apparatus to decode a portion of the media content, the maximum number of undesired words being such that the media content recognition unit can compare audio content of the portion of the media content with the maximum number of undesired words within the time taken for the decoder to decode the portion of the media content; and wherein the maximum number of undesired words is selected such that the comparison of the one or more undesired words with the received audio content can be performed at a same rate, or a greater rate, as the received audio content is decoded by the decoder;

identifying, using a time reference associated with the media content, a beginning time and an end time of each identified media content portion containing undesired words; and preventing a display of the media content to the user for a period of time starting at or near the beginning time identified using the associated time reference so as to prevent the output of all or some of the undesired words.

2. The method according to claim 1, wherein the audio content is checked and censored in real time.

3. The method according to claim 1, wherein the display of the media content to the user is prevented by muting the output of the apparatus.

4. The method according to claim 1, wherein the apparatus is a set-top-box for receiving and outputting the media content, the set-top-box including a media decoder to decode the media content for display and an additional processor, a digital signal processor, the method further comprising using the additional processor, in the media content recognition unit, to identify one or more portions of the media content that contain undesired words.

5. The method according to claim 1, wherein the media content is a television signal, or an audio stream, received by broadcast.

6. The method according to claim 1, wherein the apparatus includes a display device and the output of the media content to the user is prevented by controlling a mute function on the display device to interrupt the output of the media content from the display device.

7. The method according to claim 1, in which the media content includes a video stream, the method further comprising:

analyzing the video stream to identify faces and altering the video stream to obscure at least a portion of one or more faces when output of the media content to the user is being prevented.

8. The method according to claim 1, wherein the method further comprises performing comparisons with the maximum number of undesired words present on the list of undesired words;

wherein the maximum number of undesired words is selected such that the media content recognition unit can compare the received audio with the maximum number of undesired words within a specified time period.

9. A device for outputting media content for display to a user, the device comprising:

an input for receiving the media content, wherein the media content comprises a plurality of words;

an output for providing the media content to a display device for display to the user;

a media content recognition unit arranged to analyze the media content by identifying one or more portions of the media content that contain undesired words based on a list of undesired words, wherein:

the list of undesired words is stored by the device;

a number of undesired words present on the list of undesired words is selected based on a time taken for a decoder to decode the media content;

the device further comprises an output control unit arranged to control the output of the device to prevent the output of the media content to the user when the one or more undesired words of the media content are to be output;

the input is arranged to receive the media content including audio content;

the device further comprises a memory storing data identifying the one or more undesired words;

the media content recognition unit is further arranged to identify one or more portions of the media content that contain undesired words by comparing the received audio content with the stored data that identifies the one or more undesired words; and the output control unit is arranged to control the output of the device to prevent the output of the media content to the user when the identified undesired words within the audio content are to be output;

the device is configured to compare and identify up to a maximum number of undesired words;

the media content recognition unit is further arranged to select a maximum number of undesired words based on a time taken for the decoder of the device to decode a portion of the media content, the maximum number of undesired words being such that the media content recognition unit can compare audio content of the portion of the media content with the maximum number of undesired words within the time taken for the decoder to decode the portion of the media content;

wherein the maximum number of undesired words is selected such that the comparison of the one or more undesired words with the received audio content can be performed at a same rate or a greater rate as the received audio content is decoded by the decoder;

the media content recognition unit is further arranged to receive a time reference associated with the received media content and to identify a beginning time and an end time of each identified media content portion containing undesired words; and the device further prevents the display of the media content to the user for a period of time starting at or near the beginning time identified using the associated time reference so as to prevent the output of all or some of the undesired words.

10. The device according to claim 9, wherein the maximum number of undesired words is such that the audio content is checked and censored in real time.

11. The device according to claim 9, wherein the maximum number of undesired words is determined by a limit placed on the number of undesired words that can be stored in the memory.

12. The device according to claim 9, wherein the number of undesired words is selected to be fewer than 100, fewer than 60, fewer than 40 or fewer than 20.

13. The device according to claim 9, wherein the output control unit is arranged to impair the output of the device when the one or more undesired words of the media content are to be output.

14. The device according to claim 9, further comprising a display device, wherein the control unit is arranged to control a function on the display device to interrupt the output of the media content from the display device.

15. The device according to claim 9, wherein the device comprises a first processor for decoding the received media content to be displayed to the user and a second processor, the media content recognition unit comprising the second processor.

16. A non-transitory computer readable storage medium for an apparatus comprising an input for receiving media content and an output for providing the media content to an output device, the non-transitory computer readable medium comprising instructions that, when executed by a processor, cause the processor to perform operations comprising:
   receiving media content at the input, wherein the media content comprises a plurality of words;
   analyzing the media content using a media content recognition unit to identify one or more portions of the media content that contain undesired words based on a list of undesired words, wherein:
   the list of undesired words is stored by the apparatus;
   a number of undesired words present on the list of undesired words is selected based on a time taken for a decoder to decode the media content;
   controlling the output of the apparatus to prevent the output of the media content to the user when the one or more undesired words of the media content are to be output;
   wherein the media content includes audio content, and wherein:
   analyzing the media content using the media content recognition unit to identify one or more portions that contain undesired words includes comparing the received audio content with data stored on a memory, the data identifying the one or more undesired words;
   wherein a maximum number of undesired words is selected based on the time taken for the decoder of the apparatus to decode a portion of the media content, the maximum number of undesired words being such that the recognition unit can compare audio content of the portion of the media content with the maximum number of undesired words within the time taken for the decoder to decode the portion of the media content;
   wherein the maximum number of undesired words is selected such that the comparison of the one or more undesired words with the received audio content can be performed at a same rate or a greater rate as the received audio content is decoded by the decoder;
   identifying a beginning time and end time of each identified media content portion containing undesired words using a time reference associated with the received media content; and
   preventing the display of the media content to the user for a period of time starting at or near the beginning time identified using the associated time reference so as to prevent the output of all or some of the undesired words.

17. The non-transitory computer readable storage medium according to claim 16, wherein the audio content is checked and censored in real time.

18. The non-transitory computer readable storage medium according to claim 16, wherein the display of the media content to the user is prevented by muting the output of the apparatus.

19. The non-transitory computer readable storage medium according to claim 16, wherein the apparatus is a set-top-box for receiving and outputting the media content, the set-top-box including a media decoder to decode the media content for display and an additional processor, a digital signal processor, the method further comprising using the additional processor, in the media content recognition unit, to identify the one or more portions of the media content that contain undesired words.

20. The non-transitory computer readable storage medium according to claim 16, wherein the media content is a television signal, or an audio stream, received by broadcast.

* * * * *